United States Patent
Schmitt et al.

(10) Patent No.: US 9,604,879 B2
(45) Date of Patent: Mar. 28, 2017

(54) BELITE-CALCIUM ALUMINATE AS AN ADDITIVE

(71) Applicant: HEIDELBERGCEMENT AG, Heidelberg (DE)

(72) Inventors: Dirk Schmitt, Leimen (DE); Mohsen Ben Haha, Heidelberg (DE); Anca Itul, Heidelberg (DE); Nicolas Spencer, Malsch (DE)

(73) Assignee: HEIDELBERGCEMENT AG, Heidelberg (DE)

( * ) Notice: Subject to any disclaimer, the term of this patent is extended or adjusted under 35 U.S.C. 154(b) by 0 days.

(21) Appl. No.: 14/787,006

(22) PCT Filed: May 7, 2014

(86) PCT No.: PCT/EP2014/001215
§ 371 (c)(1),
(2) Date: Oct. 26, 2015

(87) PCT Pub. No.: WO2014/183845
PCT Pub. Date: Nov. 20, 2014

(65) Prior Publication Data
US 2016/0107933 A1    Apr. 21, 2016

(30) Foreign Application Priority Data

May 11, 2013 (EP) ..................................... 13002496
Nov. 11, 2013 (EP) ..................................... 13005291
Nov. 28, 2013 (EP) ..................................... 13005528

(51) Int. Cl.
*C04B 7/345* (2006.01)
*C04B 22/00* (2006.01)
*C04B 28/04* (2006.01)
*C04B 40/00* (2006.01)
*C04B 7/14* (2006.01)
*C04B 7/26* (2006.01)
*C04B 7/43* (2006.01)
*C04B 28/08* (2006.01)
*C04B 103/12* (2006.01)
*C04B 103/14* (2006.01)

(52) U.S. Cl.
CPC ............ *C04B 22/0093* (2013.01); *C04B 7/14* (2013.01); *C04B 7/26* (2013.01); *C04B 7/345* (2013.01); *C04B 7/43* (2013.01); *C04B 28/04* (2013.01); *C04B 28/08* (2013.01); *C04B 40/0028* (2013.01); *C04B 2103/12* (2013.01); *C04B 2103/14* (2013.01); *Y02P 40/148* (2015.11)

(58) Field of Classification Search
CPC .. C04B 7/345; C04B 7/26; C04B 7/14; C04B 7/43; C04B 14/043; C04B 22/0093; C04B 28/04; C04B 28/08; C04B 40/0028; C04B 2103/12; C04B 2103/14; C04B 40/148
See application file for complete search history.

(56) References Cited

U.S. PATENT DOCUMENTS

| | | |
|---|---|---|
| 4,507,154 A | 3/1985 | Burge et al. |
| 5,509,962 A | 4/1996 | Tang |
| 7,998,267 B2 * | 8/2011 | Gartner ................. C04B 28/065 |
| | | 106/692 |
| 8,226,763 B2 | 7/2012 | Beuchle et al. |
| 8,226,764 B2 | 7/2012 | Beuchle et al. |
| 8,382,892 B2 | 2/2013 | Beuchle et al. |
| 2007/0266903 A1 * | 11/2007 | Gartner ................... C04B 7/323 |
| | | 106/693 |
| 2013/0233207 A1 * | 9/2013 | Marchi ................... C04B 7/323 |
| | | 106/693 |

FOREIGN PATENT DOCUMENTS

| | | |
|---|---|---|
| DE | 25 48 687 A1 | 5/1977 |
| DE | 138 197 A1 | 10/1979 |
| DE | 34 14 196 A1 | 10/1985 |
| DE | 10 2005 037 771 A1 | 2/2007 |
| DE | 10 2005 037 771 B4 | 8/2007 |
| DE | 10 2007 035 257 B3 | 11/2008 |
| DE | 10 2007 035 258 B3 | 11/2008 |
| DE | 10 2007 035 259 B3 | 11/2008 |
| DE | 10 2009 018 632 A1 | 9/2011 |
| DE | 10 2009 018 632 B4 | 11/2011 |
| EA | 201592152 A1 | 3/2016 |
| EP | 0 076 927 B1 | 7/1985 |
| EP | 0 946 451 B1 | 9/2000 |
| EP | 1 719 741 A1 | 11/2006 |
| EP | 2 243 754 A1 | 10/2010 |
| EP | 2 676 943 A1 | 12/2013 |
| FR | 2 940 274 A1 | 6/2010 |
| FR | 2940274 A1 * | 6/2010 |
| WO | WO 2007/017142 A2 | 2/2007 |
| WO | WO 2009/015769 A1 | 2/2009 |
| WO | WO 2009/015770 A1 | 2/2009 |
| WO | WO 2009/015771 A1 | 2/2009 |

OTHER PUBLICATIONS

International Search Report, PCT/EP2014/001215, Jun. 18, 2014, 2 pgs.

(Continued)

*Primary Examiner* — Anthony J Green
(74) *Attorney, Agent, or Firm* — Paul D. Strain, Es.; Strain & Strain PLLC (57) ABSTRACT

The present invention relates to the use of a belite calcium aluminate obtainable in a method comprising the following steps:
a) providing a starting material that has a molar Ca/(Si+Al+Fe) ratio from 1.0 to 3.5 and a molar Al/Si ratio from 100 to 0.1,
b) mixing the raw materials,
c) hydrothermal treating of the starting material mixture produced in step b) in an autoclave at a temperature from 100 to 300° C. and a residence time from 0.1 to 24 h, wherein the water/solids ratio is 0.1 to 100,
d) tempering the intermediate product obtained in step c) at 350 to 600° C., wherein the heating rate is 10-6000° C./min and the residence time is 0.01-600 min
as an accelerator for Portland cement.

13 Claims, 3 Drawing Sheets

(56) References Cited

OTHER PUBLICATIONS

Ishida et al., "A-Dicalcium Silicate Hydrate: Preparation, Decomposed Phase, and Its Hydration", J. Am. Ceram. Soc., vol. 76, No. 7 (1993), pp. 1707-1712.
Jiang et al., "Hydrothermal Processing of New Fly Ash Cement", Ceramic Bulletin, vol. 71, No. 4 (1992), pp. 642-647.
Pimraksa et al., "Synthesis of belite cement from lignite fly ash", Ceram. Int., vol. 35 (2009), pp. 2415-2425.
Le Saoût et al., "Hydration of Portland cement with additions of calcium sulfoaluminates", Cement and Concrete Research, vol. 43 (2013), pp. 81-94.
Ping et al., "A conduction calorimetric study of early hydration of ordinary Portland cement/high alumina cement pastes", J. Material Sciences, vol. 32 (1997), pp. 3875-3881.
Takehiro et al., "Quick setting property and hydration of Portland cement with accelerating agent based on calcium aluminate", J. Soc. Mat. Sci., vol. 49, No. 2 (2000), pp. 209-214.
EPO Opposition, Appl. No. EP 13005291.3, Aug. 4, 2016, 9 pgs.
Kim et al., "Influence of Minor Ions on the Stability and Hydration Rates of β-Dicalcium Silicate", J. Am. Ceram. Soc., vol. 87, No. 5 (2004), pp. 900-905.
Jernejcic et al., "Thermal decomposition of α-dicalcium silicate hydrate", Thermochimica Acta, vol. 20 (1977), pp. 237-247.
Miyazaki et al., "Crystallographic Data of a New Phase of Dicalcium Silicate", J. Am. Ceram. Soc., vol. 81, No. 5 (1998), pp. 1339-1343.
Toraya et al., "Simulated annealing structure solution of a new phase of dicalcium silicate $Ca_2SiO_4$ and the mechanism of structural changes from α-dicalcium silicate hydrate to $α_L$'-dicalcium silicate via the new phase", Acta Cryst., vol. B58 (2002), pp. 613-621.
Hjorth et al., "Belite in Portland Cement", Cement and Concrete Research, vol. 1 (1971), pp. 27-40.

Garbev et al., "First Observation of α-$Ca_2[SiO_3(OH)](OH)$-$Ca_6[Si_2O_7][SiO_4](OH)_2$ Phase Transformation upon Thermal Treatment in Air", Journal of the American Ceramic Society, vol. 91, No. 1 (2008), pp. 263-271.
Barnes et al., "Composition of Portland Cement Belites", Cement and Concrete Research, vol. 8 (1978), pp. 559-564.
Ishida et al., "Innovative Processing for Cement Materials", MRS Bulletin (Nov. 2001), pp. 895-898.
Gosh, "Hydration of polymorphs of dicalcium silicate", il cement, vol. 3 (1985), pp. 139-146.
Locher, "Zement: Grundlagen der Herstellung und Verwendung", Verlag Bau und Technik (2000), 2 pgs.
Fylak, "Untersuchungen zum frühen Hydratationsverhalten von Portland- und Portlandkompositzementen", Dissertation Martin-Luther-Universität, (2011), 225 pgs.
Schneider, "Charakterisierung von Zementbestandteilen", Conference Paper, Forschungskolloquium des Deutschen Ausschusses für Stahlbeton, (2002), pp. 15-26.
Berechnungsblätter zur Berechnung molarer Verhältnisse aus chemischen Zusammensetzungen in Locher, Fylak, Barnes, Schneider, Aug. 1, 2016, 5 pgs.
Verein deutscher Zementwerke e.V., "Zement-Taschenbuch", Verlag Bau + Technik GmbH, vol. 51 (2008), pp. 18-27 and 112-123.
Beaudoin, "A conduction calorimetric study of early hydration of ordinary Portland cement/high alumina cement pastes", J. Materials Science, vol. 32 (1997), pp. 3875-3881.
Research Results Digest 382, "Measuring Cement Particle Size and Surface Area by Laser Diffraction", (Apr. 2013), 24 pgs.
Reschke et al, "Influence of the granulometry and reactivity of cement and additions on the development of the strength and microstructure of mortar and concrete", Betontechnische Bericht, Verlag Bau + Technik (2001), 19 pgs.
Priority Document of Patent corresponds to application EP13002496 (EP 2 801 557 A1), May 11, 2013, 24 pgs.

* cited by examiner

BELITE-CALCIUM ALUMINATE AS AN ADDITIVE

CROSS-REFERENCE TO RELATED PATENT APPLICATIONS

This application is a National Stage of International Application No. PCT/EP2014/001215, filed May 7, 2014, which is based upon and claims the benefit of priority from prior European Patent Applications No. 13002496.1, filed May 11, 2013, Ser. No. 13/005,291.3, filed Nov. 11, 2013, and Ser. No. 13/005,528.8, Nov. 28, 2013, the entire contents of all of which are incorporated herein by reference in their entirety.

The present invention relates to the use of belite calcium aluminate as an accelerator for Portland cement, to a method for accelerating the setting and/or the hardening of binders containing Portland cement, and to binders containing Portland cement and the accelerator.

Cement as a hydraulic binder is an important industrial product, which usually consists of Portland cement clinker in significant proportions. This clinker is produced by sintering a mixture of lime, sand, clay and correcting materials at approximately 1450° C. After the high-temperature reaction, the following foreign oxide-containing phases are present: alite ($Ca_3SiO_5$, is also referred to as $C_3S$), belite ($Ca_2SiO_4$, is also referred to as $C_2S$), aluminate ($Ca_3Al_2O_6$, is also referred to as $C_3A$) and ferrite ($Ca_2(Al_xFe_{1-x})_2O_5$, is also referred to as $C_4AF$ with x from approximately 0.4 to 0.6). Here, belite is present primarily in the form of the β polymorph. This phase is deemed relatively inert with a low contribution to strength in the early stage.

The hydraulic reactivity describes the reaction of a binder with water to form a solid material, which can also develop or retain its strength under water. In contrast to alite hydration, belite hydration occurs slowly over a number of months and years.

It is known that the reactivity of belite with water can be improved by mechanochemical activation (DD 138197 A1), rapid cooling after the burning process (DD 138197 A1 and DE 3414196 A1) and the incorporation of foreign oxides (U.S. Pat. No. 5,509,962 A and DE 3414196 A1). In addition, besides the β variant of belite, other polymorphs are known, which have an improved (α, α'H, α'L and x) or worse reactivity (γ).

A method for producing α-dicalcium silicate hydrate (α-$C_2SH$) at 200° C. by means of a two-hour hydrothermal treatment of burned lime (CaO) and silicic acid for laboratory syntheses (purity grade p.a.) is known from H. Ishida, S. Yamazaki, K. Sasaki, Y. Okada, T. Mitsuda, [alpha]-Dicalcium Silicate Hydrate: Preparation, Decomposed Phase, and Its Hydration, J. Am. Ceram. Soc. 76, p. 1707-1712, 1993. In the temperature range of 390-490° C., α-$C_2SH$ converts into various $C_2S$ modifications, which transition with further heating to 920-960° C. into the α'L phase and form β-$C_2S$ during cooling. A disadvantage here is the high proportion of inert γ-$C_2S$.

A method for producing a belite-containing binder is disclosed in DE 10 2009 018 632, in which an intermediate product that was produced at 120-250° C. by hydrothermal treatment of the starting material with a molar ratio Ca/(Si+Al) between 1.5 and 2.5 is subjected to reaction grinding at 100-200° C. between 5 min and 30 min. A disadvantage is that reaction grinding is an inefficient step in terms of energy. Furthermore, a sufficient compression strength after the hardening can only be achieved with addition of superplasticisers.

DE 10 2005 037 771 discloses a method for producing belite cement, in which α-dicalcium silicate hydrate (α-$C_2SH$) is produced at 100-300° C. by a hydrothermal treatment of the starting material, which contains CaO and $SiO_2$ in the molar Ca/Si ratio 1.5-2.5. In the temperature range between 500 and 1000° C., α-$C_2SH$ is converted into hydraulic reactive $C_2S$ modifications (belite cement). A disadvantage here is that the burning process has to be performed at comparatively high temperature (above 500° C.). These high temperatures furthermore lead to a reduction of the reactivity of the binder.

Jiang et al., "Hydrothermal Processing of New Fly Ash Cement", Ceramic Bulletin, 71, 1992, pages 642 to 647 describe a conversion of fly ash and CaO to $C_2S$ and $C_{12}A_7$ by hydrothermal treatment (4 h at 200° C.) and calcining at 500 to 900° C. The high temperature during calcining has a negative effect on the reactivity of the product. In addition, a pre-treatment lasting ten hours at 80° C. is necessary.

Document EP 12004620.6, which is not pre-published, describes a method for producing a binder comprising the following steps:

a) providing a starting material, from raw materials, that has a molar Ca/Si ratio from 1.5 to 2.5, with disregard during the establishment of the starting material for those constituents that are inert during a hydrothermal treatment in an autoclave, b) mixing the raw materials, c) hydrothermal treating of the starting material mixture produced in step b) in an autoclave at a temperature from 100 to 300° C. and a residence time from 0.1 to 24 h, wherein the water/solids ratio is 0.1 to 100, d) tempering the intermediate product obtained in step c) at 350 to 495° C., with a heating rate of 10-6000° C./min and a residence time of 0.01-600 min, wherein 0.1 to 30% by weight of additional elements and/or oxides are added during the mixing and/or in the following steps.

Pimraksa et al., "Synthesis of belite cement from lignite fly ash", Ceram. Int. 35 (2009) 2415-2425 demonstrate that fly ash is suitable as a starting product for the production of belite cement by hydrothermal treatment and calcining. The hydrothermal treatment takes place at 130° C., preferably in the presence of NaOH for the creation of alkaline conditions. The products of the hydrothermal treatment are then calcined at 750 to 950° C. for 30 minutes, wherein the heating rate is 8° C./min up to 600° C., and 4° C./min thereabove. $C_2S$ (β and α) and $C_{12}A_7$ are specified as the product.

These proposals are directed at the production of binders, and the products are to fully replace Portland cement (clinker) per se. A disadvantage here is that such novel cements and binders are not standardised, which significantly compromises their acceptance in the building industry. Laborious approval procedures are necessary.

It is also known that additives can accelerate the early stiffening/setting and the hardening of Portland cement. The most widespread accelerators comprise highly alkaline materials, such as alkali hydroxides, alkali carbonates, alkali silicates and alkaline and earth alkaline chlorides. Highly alkaline substances can irritate the skin and burn the eyes. Harmful effects on the respiratory system may also be produced by breathing in the dust created during the processing. Highly alkaline accelerators also reduce the final strength and increase the shrinkage. This causes cracks and thus places the durability of the structures in question. Chloride-containing accelerators are generally undesirable on a construction site because they can lead to corrosion both of the reinforcement in the concrete and of the machinery and tools.

Alkali-free accelerating admixtures for hydraulic binders, such as $Al_2(SO_4)_3$, $Al(NO)_3$, $Al(OH)_3$ and mixtures thereof, are known that avoid these disadvantages. EP 0 076 927 B1 teaches aluminium hydroxide as a particularly suitable accelerator for early stiffening and hardening of injection mortar and concrete. EP 0 946 451 describes a solution of aluminium, aluminium salts and carboxylic acids. A mixture of aluminate, alumina, a carbonate ion-releasing substance and a thixotropy-promoting substance is known from DE 25 48 687 as an accelerating admixture. The disadvantage of these accelerating admixtures is the insufficient stability of the suspensions, since the substances are not sufficiently water-soluble.

It is also known to add hydraulically reactive additives, such as amorphous calcium aluminate with a composition close to $C_{12}A_7$ in mixture with anhydrite or calcium sulphoaluminate based on ye'elimite, free lime and anhydrate, for example see Le Saoût et al. in "Cement and Concrete Research" 43, p. 81-94, 2013; Ping et al in "A conduction calorimetric study of early hydration of ordinary Portland cement/high alumina cement pastes", J. Material Sciences, 32, p. 3875-3881, 1997 and Takehiro et al in "Quick setting property and hydration of Portland cement with accelerating agent based on calciumaluminate", J. Material Science, 49, p. 209-214, 2000. The use of amorphous calcium aluminate causes an acceleration of the setting and/or of the hardening of Portland cement based on a fast ettringite formation by reaction of amorphous $C_{12}A_7$ with anhydrite. The formed C—S—H phases have a mineralogy similar to pure Portland cement, but with different proportions. The amount of ettringite increases. The production of calcium aluminates requires a high energy input and often also high-grade raw materials.

There is therefore still the problem of finding additives by means of which a high reactivity of the binder can be attained in order to thus produce efficient cements.

It has now surprisingly been found that a belite calcium aluminate obtainable from raw materials containing Ca, Si, and Al and optionally Fe by hydrothermal treatment and subsequent tempering at 350 to at most 600° C., ideally at less than 500° C., is suitable as an accelerator for Portland cement.

The object is therefore solved by the use of belite calcium aluminate as an accelerator for Portland cement, wherein the accelerator is obtainable by:
a) providing a starting material from raw materials that contain CaO, $SiO_2$, $Al_2O_3$ and $Fe_2O_3$ or other compounds of these elements and have a molar (Ca)/(Si+Al+Fe) ratio from 1 to 3.5 and a molar ratio (Al+Fe)/Si from 100 to 0.1, wherein no more than 10% by weight Mg are contained,
b) mixing the raw materials,
c) hydrothermal treating of the starting material mixture produced in step b) in an autoclave at a temperature from 100 to 300° C. and a residence time from 0.1 to 24 h, wherein the water/solids ratio is from 0.1 to 100,
d) tempering the intermediate product obtained in step c) at 350 to 600° C., wherein the heating rate is from 10-6000° C./min and the residence time is from 0.01-600 min.

Preferably, 0.1 to 30% by weight additional elements and/or oxides can be added during the mixing b) and/or in the following steps. The object is additionally solved by a method for accelerating the early stiffening/the setting and the hardening of Portland cement, in which a belite calcium aluminate obtainable as specified above is admixed to a binder containing Portland cement.

In the method, the molar ratio of the sum of calcium to the sum of silicon, aluminium and iron should be from 1.0 to 3.5, preferably from 1.5 to 2.5, particularly preferably approximately 2. The ratio of the sum of aluminium and iron to silicon is from 0.01 to 100. For a high aluminium content a ratio of the sum of aluminium and iron to silicon from 100 to 10 is preferred, for a medium aluminium content from 1 to 20, and for a low aluminium content from 0.01 to 2. Inert proportions of the elements/oxides in the raw materials are also taken into account for calculation of the ratios. The content of Mg should be at most 10% by weight or below, preferably at most 5% by weight or below.

Primary and/or secondary raw materials can be used as starting material. In a preferred embodiment, quartzes, sands or gravels, old concrete and fly ash are used as raw materials for the starting material. The desired Ca/(Si+Al+Fe) or Al/Si ratio may already be present depending on the raw material, if not, the materials have to be adjusted in terms of the chemical composition by addition of further reaction partners before the further treatment, such as Ca-, Al-, Fe- or Si-containing solid materials in order to adjust the necessary Ca:(Si+Al+Fe) ratio from 1 to 3.5, the desired Ca: ratio from 0.1 to 100, and/or the desired Al+Fe:Si ratio from 100 to 0.1. For increasing the Ca content e.g., but not exclusively, Portlandite $Ca(OH)_2$ or burned lime, ashes with high chemical CaO and/or free lime content, cement clinker and granulated blast furnace slag are suitable. For increasing the Al content, aluminium-rich fly ashes, but also clays, for example calcined clays, bauxite, Al-containing waste materials and residuals are well suited.

As a rule, the raw materials are optimised with regard to particle size and particle size distribution. To this end mechanical or thermal treatments are useful, wherein thermal treatments can also improve/optimise the (chemical) mineralogical composition. Examples for treatments are the burning of carbon (e.g. in ashes) or conversion of non reactive phases to reactive compounds, like $SiO_2$ or $C_2AS$ into $C_2S$, which in turn can improve conversion within the autoclave.

In a preferred embodiment a starting material is chosen or provided by pre-treatment that has a maximum grain size of 0.1 mm or below. For this especially the finer grain fractions from recycling cementitious binders in building materials such as used concretes and used cement are applied. A finer starting material is beneficial with regard to conversion rate as well as with regard to grinding effort for the finished cement. With a sufficiently fine starting material a grinding after the hydrothermal treatment and tempering can be superfluous. A grinding of the obtained cement is in most cases unnecessary or limited to the attainment of conventional cement finenesses. An "activating" intensive grinding is not necessary and does not take place.

Preferably, further elements or oxides in an amount of 0.1 to 30% by weight are added while mixing the raw materials b) or in the subsequent process steps. Sodium, potassium, boron, sulphur, phosphorous or a combination thereof are preferred as these further elements/oxides, which together are also preferably designated foreign oxides. Useful are alkaline and/or earth alkaline salts and/or hydroxides with the exception of Mg compounds, for example, but not exclusively, $CaSO_4.2H_2O$, $CaSO_4.\frac{1}{2} H_2O$, $CaSO_4$, $CaHPO_2.2H_2O$, $Ca_3P_2O_8$, NaOH, KOH, $Na_2CO_3$, $NaHCO_3$, $K_2CO_3$, $Na_2Al_2O_4$, $Na_3PO_4$, $K_3PO_4$, $Na_2[B_4O_5(OH)_4].8H_2O$, $CaCl_2$, $Ca(NO_3)_2$, $AlCl_3$, $Al(NO_3)_3$, $FeCl_3$, $Fe(NO_3)_3$ $Ca(CH_3COO)_2$, $Al(CH_3COO)_3$, $Ca(HCOO)_2$, $Al(HCOO)_3$ and mixtures of two, three or also more of them. In a preferred embodiment the starting material mixture has a molar ratio P/Si of about 0.05 and/or S/Si of about 0.05 and/or Ca/K of about 0.05.

The raw material mixture, optionally pre-treated as described, can optionally be mixed, i.e. seeded, with seed crystals, which for example contain calcium silicate hydrate, Portland clinker, granulated blast furnace slag, calcium sulphate aluminate (belite) cement, sodium silicate, glass powder and so on. Hereby, the reaction can be accelerated by seeding with from 0.01-30% by weight seed crystals, especially various calcium silicate and calcium silicate hydrate compounds, especially with $\alpha\text{-}2CaO.SiO_2.H_2O$, afwillite, calciochondrodite, $\alpha$- and $\beta\text{-}Ca_2SiO_4$ and other compounds.

The produced raw material mixture, which is optionally seeded as described above, is subsequently subjected in step c) to a hydrothermal treatment in an autoclave at a temperature from 100 to 300° C., preferably from 150° C. to 250° C. Hereby, a water/solids ratio from 0.1 to 100, preferably from 2 to 20, is preferably chosen. The residence times are preferably from 0.1 to 24 hours, preferably from 1 to 16 hours.

Kiln meal or hot meal can be used as at least one raw material component in the autoclaving step. The advantage lies in the fact that this material is already deacidified to a large extent, and, as a result, energy and also additional equipment can be saved. In addition, this enables a "system-in-system solution", since waste heat flows or amounts can be utilised purposefully for the autoclaving process and tempering process.

The starting material mixture produced by mixing the raw materials is converted in accordance with step c) by means of hydrothermal treatment into the intermediate product containing at least one calcium silicate hydrate or calcium aluminate hydrate or calcium aluminium silicate hydrate or (aluminium, iron) silicate hydrate or calcium (aluminium, iron) silicate and optionally further compounds. This occurs in an autoclave, at a temperature from 100 to 300° C. and a residence time from 0.1 to 24 h, wherein the water/solids ratio is from 0.1 to 100. The pressure in the autoclave is dependent on the temperature: the higher the temperature the higher the pressure. The pressure is typically from 0.5 to 10 MPa. A high pressure enables shorter residence times.

The intermediate product obtained in step c) contains at least one, usually several of the mentioned calcium silicate or aluminate hydrates, typically:

0.01 to 80% by weight $\alpha\text{-}C_2SH$, differing C—S—H forms including dellaite and partially carbonated C—S—H phases as well as amorphous and ill crystalline phases thereof 0.01 to 80% by weight katoite, Si-katoite, Fe-katoite, also as mono- and semi-carbonate as well as amorphous and ill crystalline phases thereof 0.01 to 80% by weight calcium (aluminium, iron) silicates or silicate hydrates as well as amorphous and ill crystalline phases thereof 0.01 to 80% by weight aluminium silicates and/or iron silicates and silicate hydrates as well as amorphous and ill crystalline phases thereof traces and minor components such as alumina/iron oxide and aluminium or iron hydroxides, $C_2AS$, CH, quartz and calcite.

Generally, the amorphous and ill crystalline phases are a precursor of the crystalline phases, for example calcium silicates (belite), calcium aluminates (mono calcium aluminates, mayenite), (aluminium, iron) silicates, and so on, which have no or only a low atomic (short-range) order. This is reflected in a lack of X-ray reflexes or the formation of very much broadened reflexes with low intensity. A good example for this is granulated blast furnace slag with high amorphous content (>95%). A very pronounced "glassy hill" over a 2theta range on which the main peak(s) of the crystalline phases, e.g. akermannite or gehlenite, is/are situated, depending on chemical composition, is typical. The degree of crystallinity depends on several parameters, for example the kind of starting material, the temperature, the pressure and the built-in foreign ions.

In the following step d) the intermediate product is tempered at a temperature from 350° C. to 600° C. Here, the heating rate is from 10-6000° C./min, preferably from 20-100° C./min, and particularly preferably approximately 40° C./min, and the residence time is from 0.01 to 600 min, preferably from 1-120 min, and particularly preferably from 5-60 min. There is no reaction grinding. The temperature is preferably 400 to 550° C., in particular 400 to 495° C. The higher the temperature during the burning process, the lower is preferably the duration of the burning process. Burning temperatures below 500° C. lead to particularly reactive material, however higher burning temperatures are possible and may be expedient depending on the starting material. The burning temperature and duration should be selected so as to be so high that as much starting material as possible is converted. On the other hand, the temperature should be as low as possible, since the reactivity of the product is higher and this also restricts the necessary energy and thereby the cost and the environmental impact.

After cooling, a product is obtained that comprises at least one calcium silicate $C_2S$, at least one calcium aluminate and at least one X-ray amorphous phase. Usually, the product contains the following components:

1-95% by weight reactive calcium aluminates, preferably in the form of crystalline $C_{12}A_7$, or ill crystalline or amorphous aluminate phases 1-80% by weight $C_2S$ polymorphs, in the form of crystalline, ill crystalline or amorphous phases 1-80% by weight calcium aluminate silicates, in the form of crystalline, ill crystalline or amorphous phases up to 30% by weight traces and minor components, in particular $C_5A_3$, CA, calcium oxide, $\gamma$ alumina and other aluminas, quartz and/or limestone, CaO, calcium sulphate, $Fe_3O_4$, iron silicates such as $Fe_2SiO_4$, amorphous iron-containing phases and 0-30% by weight hydrates from the hydrothermal treatment, wherein all amounts of the product sum up to 100% and the sum of calcium silicates, calcium aluminates and calcium aluminium silicates is at least 30% by weight, preferably at least 50% by weight and most preferred at least 70% by weight.

In one embodiment, the product comprises at least one calcium silicate, calcium aluminate, calcium aluminium silicate, calcium (aluminium, iron) silicate, or/and at least one X-ray amorphous phase, wherein the sum of calcium silicates, calcium aluminates, calcium aluminium silicates and calcium (aluminium, iron) silicates is at least 30% by weight.

Provided that the fineness of the product is already sufficient (use of fine raw materials with suitable particle size distribution), the product is already the desired accelerator. If the fineness is insufficient or a binder with particularly high fineness is desired, the product can be ground in a manner known per se, with or without additions, to the desired fineness or particle distribution, respectively. A suitable fineness is, for example, from 2000 to 10,000 $cm^2/g$ (Blaine).

The accelerator is added in an amount from 2 to 20% by weight, preferably 5 to 10% by weight, to a binder that contains Portland cement. The Portland cement is typically contained in an amount ranging from 80 to 98% by weight, preferably 90 to 95% by weight.

As a result of the addition of the accelerator according to the invention, significant amounts of aluminium are introduced in some cases. It is therefore preferable to adapt the amount of calcium sulphate in the binder, that is to say, in the case of an accelerator with high and medium aluminium content, additional calcium sulphate is preferably also added to the binder. Amounts from 10 to 40% by weight, preferably approximately 30% by weight, based on the accelerator, have proven to be expedient. The amount of calcium sulphate is matched to the alumina content, such that both are contained in the binder in a balanced ratio, that is to say a molar ratio $SO_3$ to $Al_2O_3$ from 2.5 to 3.0, preferably from 2.9 to 3.0, is provided.

Besides the accelerator according to the invention and Portland cement, the binder can additionally contain one or more further components. Pozzolans, in particular fly ash, are particularly suitable. Further possible components are metakaolin and limestone. These components can be added in the desired fineness or can be ground together with the accelerator and/or the Portland cement.

The BET surface of the binder should range from 1 to 30 $m^2/g$.

The binder is suitable for all applications for which Portland cement is used. By way of example, for concrete for the production of pre-cast units, such as panels, beams, road parts, and as cast-in situ concrete in the construction of buildings, dams, etc. The binder is also well suited for mortar, plaster, screed, etc. Admixtures, additions and aggregates can also be used in a manner known per se during the processing. Admixtures include, for example, plasticisers, retarders, corrosion-inhibiting admixtures, shrinkage-reducing admixtures, and air-entraining admixtures. The additives are used in the usual amounts.

As a result of the accelerator according to the invention, use thereof and the method according to the invention, hydraulically highly reactive binders based on Portland cement and $C_2S$, $C_{12}A_7$ and amorphous phases can be produced. The accelerators are characterised in that highly reactive polymorphs of $C_2S$, highly reactive calcium (aluminium, iron) silicates, $C_{12}A_7$ and X-ray amorphous as well as ill crystalline phases are contained.

In contrast to DE 10 2009 018 632, DE 10 2007 035 257, DE 10 2007 035 258 and DE 10 2007 035 259, there is no reaction grinding, since this step is energy intensive and products produced in this way have a lower reactivity than the products produced with the method described here from raw materials having a different composition.

In contrast to prior proposals for the production of belite binders with a use of raw materials containing aluminium, the temperature during tempering is restricted to below 600° C., preferably to below 550° C. and in particular to below 500° C., so that very reactive polymorphs of $C_2S$ and $C_{12}A_7$ and other phases and an X-ray amorphous phase are obtained. Thereby a very high reactivity and a particularly fast hydration based on the formed calcium and aluminium silicate hydrates is achieved.

In contrast to the known accelerators such as calcium aluminate, high-alumina cement, and calcium sulphoaluminate cement, the accelerator according to the invention requires less energy during production (hydrothermal treatment and tempering instead of sintering at 200° C.). Compared with aluminium salts, the use as a dry substance is possible, and there are no problems in terms of the stability of suspensions.

The invention will be explained with reference to the following examples, but without restricting the scope to the specific embodiments described. If not otherwise specified or if not absolutely otherwise clear from the context, any amount in % is by weight, and in the case of doubt referring to the total weight of the mixture.

The invention further includes all combinations of preferred embodiments that do not exclude each other. A characterisation as "approximately" or "around" in relation to a numerical value means that at least up to 10% higher or lower values or up to 5% higher or lower values, and in any case up to 1% higher or lower values are included.

EXAMPLE 1

A starting material mixture containing 35.44% CaO and 64.56% Geloxal was produced from the raw materials listed in Table 1.

TABLE 1

| Raw material | CaO | Geloxal |
| --- | --- | --- |
| Loss on ignition at 1050° C. | 0% | 45.65% |
| $SiO_2$ | | |
| $Al_2O_3$ | | 50% |
| $TiO_2$ | | |
| MnO | | |
| $Fe_2O_3$ | | |
| CaO | 100% | 0.14% |
| MgO | | 0.10% |
| $K_2O$ | | |
| $Na_2O$ | | 1.14% |
| $SO_3$ | | 0.38% |
| $P_2O_5$ | | |

Figure 1:
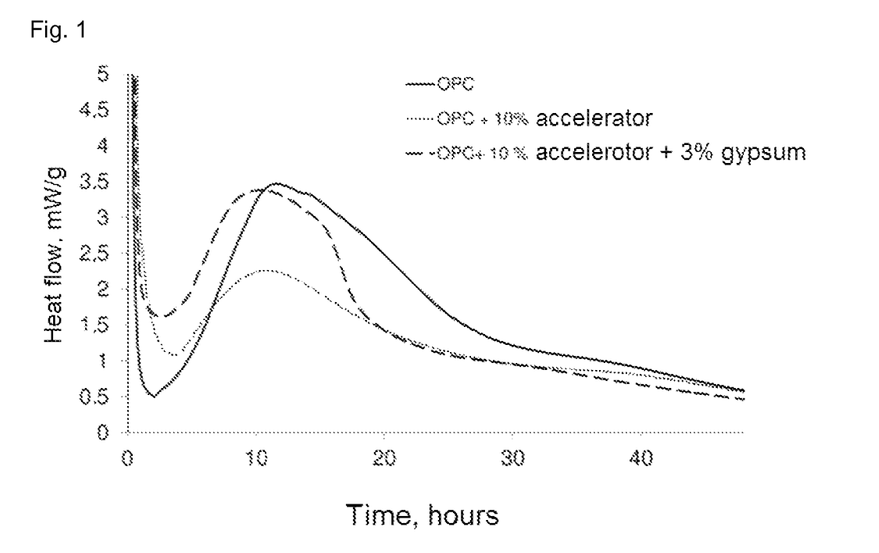

The starting material mixture was mixed with water at a water/solids ratio of 10, and was treated for 16 hours at 185° C. and 1.1 MPa in a high-grade steel autoclave. The intermediate products were tempered for 1 hour at 500° C. Mixtures of 10% of the obtained accelerator with Portland cement and of 10% of the accelerator and 3% gypsum with Portland cement were reacted in a calorimeter to check the hydraulic reactivity with a water/solids ratio of 0.5. For comparison, pure Portland cement with the same water/solids ratio was used. The obtained heat flows and cumulative heat flows are shown in FIG. 1. In the figure, OPC denotes pure Portland cement, OPC+accelerator denotes the mixture of OPC and the accelerator according to the invention, and OPC+accelerator+gypsum denotes the mixture of OPC, accelerator and gypsum.

It can be seen that the binder accelerated in accordance with the invention is very reactive and that even small amounts of the accelerator accelerate the hydration of Portland cement. The main peak of the heat development is clearly shifted to the left, that is to say the heat development initiates more quickly. The cumulative heat flow determined after 8 hours for the binder with accelerator and gypsum is twice as high as that for pure Portland cement. After 16 hours it is still 40% more.

EXAMPLE 2

A starting material mixture containing 62.5% Portlandite, 20.27% quartz and 17.23% Geloxal was produced from the raw materials listed in Table 2 and reacted in accordance with Example 1 to form an accelerator.

TABLE 2

| Raw material | Portlandite | Quartz | Geloxal |
|---|---|---|---|
| Loss on ignition at 1050° C. | 24.33% | | 45.65% |
| $SiO_2$ | | 100% | |
| $Al_2O_3$ | | | 50% |
| $TiO_2$ | | | |
| MnO | | | |
| $Fe_2O_3$ | | | |
| CaO | 75.67% | | 0.14% |
| MgO | | | 0.10% |
| $K_2O$ | | | |
| $Na_2O$ | | | 1.14% |
| $SO_3$ | | | 0.38% |
| $P_2O_5$ | | | |

Figure 2:
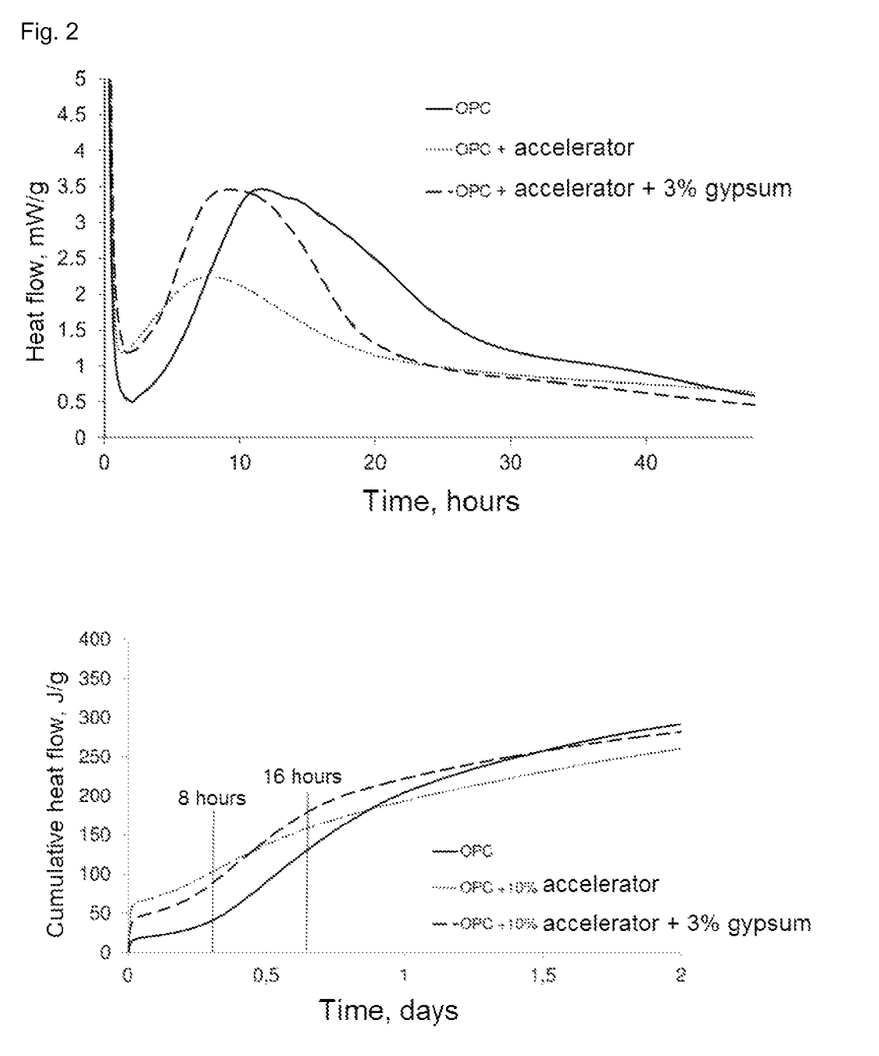

The hydraulic reactivity was checked as in Example 1. The measured heat flows and cumulative heat flows are illustrated in FIG. 2.

It can be seen that again the main peak of the heat flow is earlier, that is to say the heat development initiates more quickly. The cumulative heat flow for the binder with accelerator and gypsum, after 8 hours, is 113% of that measured for pure Portland cement. It is still 38% higher after 16 hours.

EXAMPLE 3

Figure 3:
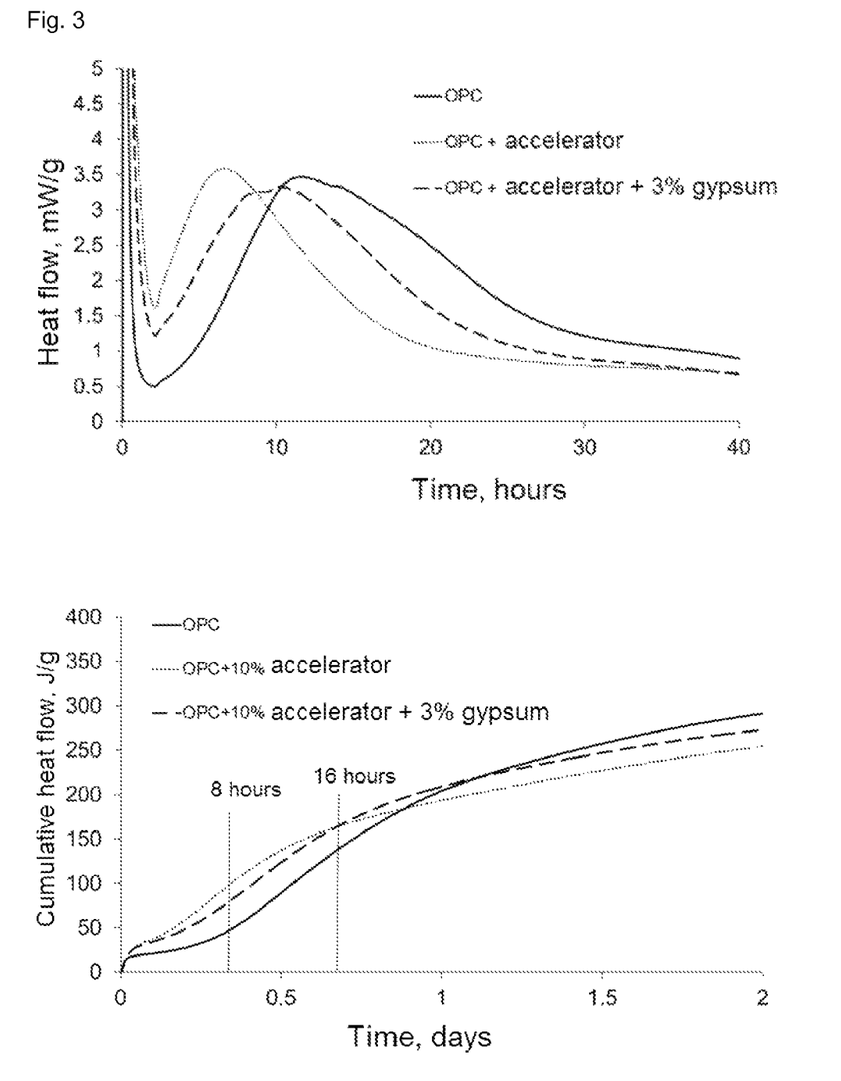

A starting material mixture containing 66.55% Portlandite, 24.28% quartz and 9.17% Geloxal was produced from the raw materials listed in Table 2 and reacted in accordance with Example 1 to form an accelerator. The hydraulic reactivity was checked as in Example 1. The measured heat flows and cumulative heat flows are shown in FIG. 3.

It can be seen that the main peak of the heat flow is also earlier here, that is to say the heat development initiates more quickly. The cumulative heat flow for the binder with accelerator and gypsum, after 8 hours, is 72% of that measured for pure Portland cement. It is still 25% higher after 16 hours.

It is clear from the examples that the accelerator according to the invention leads to binders based on Portland cement that have high early strength, that is to say the hardening can be significantly accelerated. Energy use and $CO_2$ emissions can be lowered compared with accelerators based on ye'elimite, for example.

The invention claimed is:

1. A method for accelerating the early stiffening/setting and/or the hardening of Portland cement comprising adding to the Portland cement a belite calcium aluminate accelerator produced according to the following steps:
   (a) providing one or more raw materials selected from the group consisting of Ca-, Al-, Fe-, and Si-containing solid materials,
   (b) mixing the raw materials to form a starting material mixture, wherein the starting material has a molar Ca/(Si+Al+Fe) ratio from 1 to 3.5 and a molar Al/Si ratio from 100 to 0.1,
   (c) hydrothermally treating the starting material mixture produced in step (b) in an autoclave at a temperature from 100 to 300° C. and a residence time from 0.1 to 24 hours, wherein a water/solids ratio is 0.1 to 100, to form an intermediate product, and
   (d) tempering the intermediate product obtained in step (c) at 350 to 600° C., wherein a heating rate is between 10-6000° C./min and a residence time is between 0.01-600 min to form the belite calcium aluminate accelerator.

2. The method according to claim 1, further comprising adding calcium sulfate to the Portland cement.

3. The method according to claim 2, wherein calcium sulfate is added in an amount from 10 to 40% by weight based on the accelerator.

4. The method according to claim 1, wherein the belite calcium aluminate accelerator comprises at least one compound selected from the group consisting of calcium silicate, calcium aluminate, calcium aluminium silicate, calcium (aluminium, iron) silicate, and at least one X-ray amorphous phase, wherein the sum of calcium silicates, calcium aluminates, calcium aluminium silicates and calcium (aluminium, iron) silicates is at least 30% by weight.

5. The method according to claim 1, wherein the belite calcium aluminate accelerator comprises the following components:
   1-95% by weight reactive calcium aluminates, in the form of crystalline $C_{12}A_7$, or semi-crystalline or amorphous aluminate phases,
   1-80% by weight calcium (aluminium, iron) silicates, in the form of crystalline, semi-crystalline or amorphous phases,
   1-80% by weight $C_2S$ polymorphs, in the form of crystalline, semi-crystalline or amorphous phases,
   1-80% by weight calcium aluminate silicates, in the form of crystalline, semi-crystalline or amorphous phases,
   up to 30% by weight traces and minor components, and
   0-30% by weight hydrates from the step (c) hydrothermal treatment.

6. The method according to claim 5, wherein the traces and minor components are one or more compounds selected from the group consisting of $C_5A_3$, CA, calcium oxide, aluminas, quartz, limestone, CaO, calcium sulfate, FeO, $Fe_2O_3$, $Fe_3O_4$, iron silicates, $Fe_2SiO_4$, and amorphous iron-containing phases.

7. A binder containing Portland cement and an accelerator consisting of a belite calcium aluminate produced according to the following steps:
   (a) providing one or more raw materials selected from the group consisting of Ca-, Al-, Fe-, and Si-containing solid materials,
   (b) mixing the raw materials to form a starting material mixture, wherein the starting material has a molar Ca/(Si+Al+Fe) ratio from 1 to 3.5 and a molar Al/Si ratio from 100 to 0.1,
   (c) hydrothermally treating the starting material mixture produced in step (b) in an autoclave at a temperature from 100 to 300° C. and a residence time from 0.1 to 24 hours, wherein a water/solids ratio is 0.1 to 100, to form an intermediate product, and
   (d) tempering the intermediate product obtained in step (c) at 350 to 600° C., wherein a heating rate is between 10-6000° C./min and a residence time is between 0.01-600 min to form the accelerator.

8. The binder according to claim 7, wherein a measured Brunauer-Emmett-Teller surface area of the binder ranges from 1 to 30 $m^2/g$.

9. The binder according to claim 7, wherein the binder further contains latent hydraulic materials and/or pozzolans.

10. The binder according to claim 7, wherein the binder further contains metakaolin and/or limestone.

11. The binder according to claim 7, wherein the belite calcium aluminate comprises at least one calcium silicate, calcium aluminate, calcium aluminium silicate, calcium (aluminium, iron) silicate, and at least one X-ray amorphous phase, wherein the sum of calcium silicates, calcium aluminates, calcium aluminium silicates and calcium (aluminium, iron) silicates is at least 30% by weight.

12. The binder according to claim 7, wherein the belite calcium aluminate comprises the following components:
- 1-95% by weight reactive calcium aluminates, in the form of crystalline $C_{12}A_7$, or semi-crystalline, or amorphous aluminate phases,
- 1-80% by weight calcium (aluminium, iron) silicates, in the form of crystalline, semi-crystalline, or amorphous phases, which may contain foreign ions such as Ca, Fe and Al 1-80% by weight $C_2S$ polymorphs, in the form of crystalline, semi-crystalline, or amorphous phases,
- 1-80% by weight calcium aluminate silicates, in the form of crystalline, semi-crystalline or amorphous phases,
- up to 30% by weight traces and minor components, and
- 0-30% by weight hydrates from the step (c) hydrothermal treatment.

13. The binder according to claim 12, wherein the traces and minor components are one or more compounds selected from the group consisting of $C_5A_3$, CA, calcium oxide, aluminas, quartz, limestone, CaO, calcium sulfate, FeO, $Fe_2O_3$, $Fe_3O_4$, iron silicates, $Fe_2SiO_4$, and amorphous iron-containing phases.

* * * * *